(12) United States Patent
Collombet et al.

(10) Patent No.: US 9,911,071 B2
(45) Date of Patent: *Mar. 6, 2018

(54) METHOD AND SYSTEM FOR CONTROLLING PACKAGING OF ITEMS ON A PRODUCTION/DISTRIBUTION LINE

(71) Applicant: SICPA HOLDING SA, Prilly (CH)

(72) Inventors: Yvan Collombet, Peron (FR); Daniel Cotsford, Clarens (CH); Rodrigo Lorca, Aclens (CH); Luciano Torres, Vevey (CH); Christian Fefin, Malbuisson (FR)

(73) Assignee: SICPA HOLDING SA, Prilly (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/360,786

(22) PCT Filed: Nov. 23, 2012

(86) PCT No.: PCT/EP2012/073478
§ 371 (c)(1),
(2) Date: May 27, 2014

(87) PCT Pub. No.: WO2013/079408
PCT Pub. Date: Jun. 6, 2013

(65) Prior Publication Data
US 2014/0343719 A1    Nov. 20, 2014

Related U.S. Application Data

(60) Provisional application No. 61/564,119, filed on Nov. 28, 2011.

(30) Foreign Application Priority Data

Nov. 28, 2011    (EP) .................................. 11009413

(51) Int. Cl.
    *G06Q 10/08*  (2012.01)
    *G06K 19/00*  (2006.01)
    *B65B 57/10*  (2006.01)

(52) U.S. Cl.
    CPC .............. *G06K 19/00* (2013.01); *B65B 57/10* (2013.01); *G06Q 10/08* (2013.01)

(58) Field of Classification Search
    CPC ........... B65B 57/12; B65B 5/06; B65B 51/44; B65B 57/10; G06Q 10/08; G06Q 10/06;
    (Continued)

(56) References Cited

U.S. PATENT DOCUMENTS 8,428,773 B1 *  4/2013  Carr ........................ G06Q 50/04
                                                                426/392
8,565,914 B2 * 10/2013  Marrese ................. G06Q 10/08
                                                                700/229
(Continued)

FOREIGN PATENT DOCUMENTS

EP         1764321          3/2007
WO    WO2010037175          4/2010

OTHER PUBLICATIONS

Mexican Office Action in counterpart Mexican Application No. MX/a/2014/006353, dated Aug. 17, 2015.
(Continued)

*Primary Examiner* — Sonji Johnson
(74) *Attorney, Agent, or Firm* — Greenblum & Bernstein, P.L.C.

(57) ABSTRACT

The disclosed method, and corresponding system, for controlling items on a production/distribution line relies on secure identification of items transported arranged in a given disposition along a transport path at a site of collection and packaging of the items, and association of ID data of some of the packed items with corresponding packaging ID data so as to ensure reliable identification of package content delivered on the line.

14 Claims, 3 Drawing Sheets

(58) Field of Classification Search
CPC .... G06Q 10/0833; G06Q 40/08; G06Q 50/28; G06K 19/00
See application file for complete search history.

(56) References Cited

U.S. PATENT DOCUMENTS

| | | |
|---|---|---|
| 2006/0219782 A1 | 10/2006 | Wong et al. |
| 2007/0203808 A1* | 8/2007 | Sekimoto ............ G06Q 10/087 705/28 |
| 2008/0121537 A1 | 5/2008 | Sankaran et al. |
| 2009/0187266 A1* | 7/2009 | Kotula .......................... 700/110 |
| 2010/0234982 A1 | 9/2010 | Sankaran et al. |
| 2011/0178633 A1 | 7/2011 | Marrese et al. |

OTHER PUBLICATIONS

Ukrainian Office Action in counterpart Ukrainian Application No. a 2014 07221, dated Oct. 2, 2015, and translation thereof.
Mexican Office Action in counterpart Mexican Application No. MX/a/2014/006353 dated Jul. 4, 2016. (w/ English language translation).
Mexican Office Action conducted in counterpart Mexican Application No. MX/a/2014/006353, dated Apr. 11, 2016.
Mexico Office Action conducted in counterpart Mexico Appln. No. MX/a/2014/006353 (dated Jan. 15, 2016) (w/ English translation).

* cited by examiner

METHOD AND SYSTEM FOR CONTROLLING PACKAGING OF ITEMS ON A PRODUCTION/DISTRIBUTION LINE

TECHNICAL FIELD

The present invention relates to the technical field of control systems for automated production or distribution lines. The invention particularly relates to the technical field of systems for tracking and tracing items on a production/distribution line.

BACKGROUND OF THE INVENTION

Many methods are implemented in industry for controlling production/distribution lines, not only for detecting problems arising on transport paths but also reliably determining a quantity of items produced or distributed on said lines. Particularly, some of these methods are used for ensuring proper dispatching or packaging of said items, or even further allowing accurate billing or tax accounting of the items so produced or distributed.

Imaging devices are of common use for controlling production of items on automated production lines. For example, on bottling lines, strobe light (using a LED lighting unit controlled by a laser trigger device which detects the presence of an item, for example) illuminates bottles transported in single file on a conveyor and marked with a barcode (1D or 2D barcode, like SKU code or data matrix, for example), and digital cameras take digital images of the so illuminated bottles. A strobe light source typically uses a LED lighting unit controlled by a laser trigger device, which detects the presence of an item. Conventional image processors automatically detect on a digital image of an item a region of interest containing a barcode pattern and then identify the item by decoding the detected barcode. Such identification may be used, for example, for correctly labeling the above bottles according to their type (or content, etc.). There are many known techniques relating to image processing which can be used for identifying an item marked with an identifier (including item identification data) from a digital image of said identifier.

The above imaging devices, or readers, may be adapted to read identifiers from light reflected or emitted by said identifier within any optical wavelength range between the UV (ultraviolet) and the IR (infrared).

There are also many other well known techniques adapted to different types of identifiers. For example, an RFID reader is adapted for reading identifiers like RFID tags disposed on items, these RFID tags including item identification data (possibly encrypted). As another non-limiting example, the identifier may be a magnetic marking, and the corresponding adapted reader is then of magnetic sensor type.

Thus, whatever specific type of identifier including identification data is used for marking items transported on a production/distribution line, an adapted type of reader is used for reading said identifier and sending a corresponding reader signal to a controller having a processor capable of extracting identification data from said reader signal.

Items on a conventional production/distribution line are transported (for example, on a conveyor) arranged in single file, each transported item being marked with a unique item identifier including unique item identification data of the item, the items are then successively collected by a collector device (like a pusher, for example) to form a batch of a given number N of said items. Such a batch of items is then packaged by a packaging device, and a corresponding packed batch is delivered. The collector device generally includes a sensor operable to detect that a batch of N items has been formed (for example, a mechanical counter, or an electronic counter in which a light beam between diodes is interrupted by a transported item). This sensor is operable to deliver a batch signal each time a batch of N items has been counted.

Operations on the line are generally controlled by a controller. Also, mounted on the line, at the level of a reading zone, a reader connected to the controller typically reads the unique identifier on each one of the items in single file within said reading zone, and sends corresponding successive reader signals to the controller. The controller has a processor programmed to extract each unique item identification data from the received reader signals. The processor may in fact be split, for example, between the controller itself and the reader (i.e. some processing steps of the reader signal being then executed at the reader), or may even involve a remote connected processing unit.

As an example, the reader classically comprises a camera (or a plurality of cameras around the reading zone, and possibly including illumination source for illuminating the items to be imaged) set for reading a barcode on one item at a time as the items in single file are transported through the reading zone, by taking a digital image of a region of interest containing the barcode on the (illuminated) item. Many known methods are available to be implemented by the processor for detecting and decoding the digital image of the barcode sent by the reader.

However, due to quite frequent jams on the line causing loss or deterioration of items, or even due to fraudulent interception of items along the transport path between the reading zone and the collector device, it is not sure that all the items identified by the reader in fact correspond to the items counted at the level of the collector device's sensor. Thus, problems are generated in case items having being identified on the line (and thus, possibly accounted for taxation, or billed as being delivered) are lost before being collected by the collector device, or in case the collected batches of items in fact contain unidentified items and are nevertheless distributed, or packaged by the packaging device.

Moreover, the above problems are even made worse in case the items must be transported in groups along the transport path.

Consequently, the above conventional controlling of operations is not well adapted to real-time item identification, particularly on high speed production or distribution lines, and especially if the items are transported grouped along the transport path and that every single item passing on the line needs to be identified.

SUMMARY OF THE INVENTION

In view of the above mentioned limitations of the background art, the present invention is therefore aimed at providing a robust real-time method and a corresponding system for controlling items on a production/distribution line. An object of the invention is to provide a production/distribution control tool which is well adapted to high speed production/distribution lines carrying items maintained in a given disposition on the transport path, whilst being capable of processing read signals for every single item passing on the line, for precise identification of collected items and improved detection of damaged items.

In the following, the processor of a controller, and thus processing steps carried out via said processor, are defined in a broad sense which includes the possibility of being distributed between a plurality of units connected to the controller (as known in the art), although being designated as a processor of the controller.

The invention is particularly adapted to the case the items are transported by batches on the line, the items being maintained a given disposition within each batch. As a non-limiting example, the items may be transported already packed by batch within a packaging adapted for allowing a reader to read identifiers on the items. As an illustration, for example in case the items are cigarette packs, and the identifier is a barcode printed on the pack (or on a label stuck on the pack), said adapted packaging may be a transparent film wrapped around a batch of cigarette packs so that an optical reader can read the barcodes on the packs through the wrapping film.

As another non-limiting example, wherein the items are transported grouped (possibly by batch of a given number of items) according to a given disposition, the reading zone has an extension covering a group of items, and the reader may be a camera capable of taking a digital image of a group of items in the reading zone. Cameras capable of taking a global digital image of a group of objects, coupled to an image processor operable to detect objects among a plurality of objects (or patterns) within said digital image are now available. Thus, the processor capable to detect each barcode (or item identifier), considered as an object or pattern, within a digital image of a group of barcodes are available. By further programming the processor so as to extract the corresponding identification data for each detected item identifier (for example, decoding each barcode detected in the digital image) according to an ordering which corresponds, by a one-to-one mapping, to the respective positions of the items within the above group of items, one arrives at a reader suitable for implementing the invention. Said one-to-one mapping clearly always exists in case the items are transported grouped according to a given disposition, as the relative positions of the items within the group are not modified during transport along the transport path, particularly when the group of items crosses the reading zone.

A first aspect of the invention relates to a method for controlling items on a production/distribution line wherein, the items are transported arranged according a given disposition along a transport path of the line through a reading zone toward a collector device operable to collect the items received from the reading zone to form a batch of a given number N of said items, each transported item is marked with a unique item identifier including unique item identification data of the item, the collector device includes a sensor operable to detect that a batch of N items has been formed and deliver a corresponding batch signal to a controller, said collector device is further operable to deliver a batch of N collected items to a packaging device connected to the controller, said packaging device is operable to pack the batch of N items delivered by the collector device into a batch packaging marked with a batch packaging identifier including batch packaging identification data to form a packed batch and deliver said packed batch, said method comprising the further steps of: reading at least one unique identifier on at least one of the items at corresponding at least one given position within the reading zone, by a first reader, the first reader being connected to the controller and sending corresponding first reader signal to the controller; extracting each unique item identification data from the received first reader signal in accordance with an ordering corresponding to said given disposition of the items and given position, by the controller; sequentially storing in a memory connected to the controller, to form a list of unique item identification data, each unique item identification data extracted from said first reader signal according to said ordering and position, by the controller; upon delivering of a batch signal by the sensor, delivering the batch of N items collected by the collector to the packaging device, packing said delivered batch into a batch packaging and delivering corresponding packed batch, and reading the batch packaging identifier on the batch packaging of the packed batch delivered by the packaging device by a second reader connected to the controller, the second reader sending corresponding second reader signal to the controller; extracting a batch packaging identification data from the received second reader signal, and retrieving in the list, according to said ordering and position, unique item identification data corresponding to at least one of the N items in the packed batch delivered by the packaging device, by the controller; and storing in the memory said extracted batch packaging identification data associated with said retrieved unique item identification data, by the controller.

Due to the ordering of the extraction of each item identification data, in one-to-one correspondence with the relative positions of the items having a given disposition on the transport path in the reading zone, up to all the items within the reading zone can be identified, whatever said given disposition of the items may be, if all the corresponding identifiers have been read. Thus, the invention is particularly well adapted to high speed production or distribution lines carrying items maintained in a given disposition on the transport path, whilst being capable of processing read signals for every single item passing on the line. According to a variant of the above method, and corresponding system (see below), the first reader may in fact read only one identifier on one test item, at a test position in the reading zone, among a group of transported items, or only few of the identifiers on few test items at given test positions. Thus, as the first reader may only have to read a reduced number of identifiers, and even as few as only one identifier over N, on the items within the reading zone, the corresponding equipment can be quite simple and compact. Nevertheless, in a preferred embodiment of the invention, all the identifiers of the items in the reading zone are read by the first reader, and all the corresponding unique item identification data are extracted by the controller and thus appear in the list, so that a full content of a packed batch is identified when the controller retrieves in the list item identification data of all the N items in the packed batch.

The invention is thus particularly suitable for identifying items which are transported on the line already packaged (in some adapted packaging) before being collected and further packed in a batch packaging. For example: the grouped items may be cigarette packs transported already wrapped in a transparent film and forming a carton of cigarette packs, the reading zone corresponding to the dimensions of a carton, each cigarette pack being marked with a barcode (unique item identification data), and each barcode on the packs within the carton being readable by a camera (first reader), possibly from a single digital image of the carton by using image processing operable to detect each barcode within the digital image, and decode each detected barcode according to an ordering corresponding to the disposition of the cigarette packs within the carton. Then, a packaging device may package a batch of a given number N of cigarette packs, corresponding to a given number K of cartons, into a case (batch packaging) marked with a barcode like a datamatrix (as an example of batch packaging identifier) including encoded data representing batch packaging identification data. For example: a carton may contain 20 cigarette packs, and a case may contain 10 cartons (K=10), so that the collector in fact collects N=10×20=200 cigarette packs. In a variant of this example, an item now corresponds to a carton marked with a barcode, the items are transported arranged in single file and the first reader reads the barcode marked on each of the cartons sequentially crossing the reading zone (a batch of N cartons being then packaged into a case, for example: N=10). This barcode may further include identification data on the cigarette packs contained in the carton.

In a variant of the above invention, the level of security may even be increased by allowing the controller to set the test position of a test item within the reading zone (this setting may further programmed to vary over time). The number of test items may also be set. In case only few test items are read in the reading zone, it is thus not possible for an observer to know in advance which items will be read. As a consequence, the possibility to detect unidentified item and/or a fraudulent interception is increased even if only few test items are identified. In a preferred embodiment of the invention, all the identifiers of the items within the reading zone are read and corresponding item identification data appear in the list. Moreover, the controller may retrieve in the list item identification data corresponding to only few of the N collected items, possibly only one, which have been packed into a batch packaging upon delivering of the batch signal by the sensor.

In another variant of the above invention, a clock may deliver time data to the controller which may associate this time data with the item ID data as they are stored in the memory according said ordering to form the list, thus allowing a technician consulting the list stored in the memory to better diagnose a cause of a problem on the line.

In a preferred embodiment of the invention, the reading zone is adjacent to the sensor and entry of the collector device. Thus, security is enhanced as the transport path from the reading zone to the collector is reduced to minimum.

According to a first variant of the above method according to the invention, in case the controller fails to extract a unique item identification data from a received first reader signal or a batch packaging identification data from a received second reader signal, it respectively delivers a first or a second identification error data as the unique item identification data or batch packaging identification data respectively corresponding to said received first or second reader signal.

This allows keeping track of any extraction problem directly in the list. In said first variant, the controller may further have the possibility to deliver an error message, so as to help a technician diagnosing a cause of an error, in case an extraction of identification data has failed. Consequently, the method may include a further step wherein, in case a first and a second identification error data relating to a delivered packed batch are delivered, the controller further delivers an error message. In this case, the error message may further indicate an extraction error relating to a first reader signal and a second reader signal. According to the method, in case the controller delivers a first identification error data and extracts a batch packaging identification data from a received second reader signal relating to a delivered packed batch, the controller further delivers an error message. In this case, the error message may further indicate an extraction error relating to a first reader signal. Also, in case the controller only delivers a second identification error data relating to a delivered packed batch, the controller delivers an error message. In this case, this error message may further indicate an extraction error relating to a second reader signal. Moreover, in case any error message is delivered, the controller may further store said error message in the memory. Particularly, in case an error message is delivered by the controller, the above method may comprise the further step of associating in the memory said error message with the corresponding batch packaging identification data of the delivered packed batch, by the controller. This specific feature allows better tracing the history of the aggregation or packaging operations on the line. Particularly, if time data delivered by a clock is further associated to said error message and said corresponding extracted batch packaging identification data of the batch packaging of the delivered packed batch. The above specific feature is also particularly useful for identifying batches containing unknown items (not identified by the first reader) in case specific action is required: such as ejection of a batch or special labeling. Moreover, any error message may further be uploaded and accessible through reports.

An error message delivered by the controller may further be sent to a display (possibly associated with time data delivered by the above mentioned clock), in order to alert an operator watching operations on the line, for example, or may be sent, as well as any part of the data stored in the memory, to a remote device via an appropriate transmitter. The above possibility of detecting and signaling errors is advantageous, as it is easy to determine from the list which batch is in fact concerned by an error message without having to stop the line or affect the sequential storage of item identification data relating to the next items arriving in the reading zone.

The invention also relates to a system for controlling items on a production/distribution line which is operable to implement any of the above mentioned aspects and/or variants of the method for controlling items on a production/distribution line according to the invention, and also corresponding use of said system, as specified above.

Accordingly, a second aspect of the invention relates to a system for controlling items on a production/distribution line, comprising a transport operable to transport items arranged according a given disposition along a transport path of the line through a reading zone toward a collector device operable to collect the items received from the reading zone to form a batch of a given number N of said items, each transported item being marked with a unique item identifier including unique item identification data of the item, the collector device including a sensor operable to detect that a batch of N items has been formed and deliver a corresponding batch signal to a controller, said collector device being further operable to deliver a batch of N collected items to a packaging device connected to the controller, said packaging device being operable to pack the batch of N items delivered by the collector device into a batch packaging marked with a batch packaging identifier including batch packaging identification data to form a packed batch and deliver said packed batch, wherein: a first reader connected to the controller is operable to read at least one unique identifier on at least one of the items at corresponding at least one given position within the reading zone, the first reader being operable to send corresponding first reader signal to the controller; the controller is operable to extract each unique item identification data from a received first reader signal, in accordance with an ordering corresponding to said given disposition of the items and given position; the controller is operable to sequentially store in a memory connected to the controller, to form a list of unique item identification data, each unique item identification data extracted from a first reader signal according to said ordering and position; upon delivering of a batch signal by the sensor, the collector is operable to deliver the batch of N collected items to the packaging device, the packaging device is operable to pack the received batch of N items into a packaging batch and deliver a corresponding packed batch, and a second reader connected to the controller is operable to read the batch packaging identifier on the batch packaging of the packed batch delivered by the packaging device, the second reader being operable to send corresponding second reader signal to the controller; the controller is operable to extract a batch packaging identification data from a received second reader signal, and retrieve in the list, according to said ordering and position, unique item identification data corresponding to at least one of the N items forming the batch of collected items in the packed batch delivered by the packaging device; and the controller is further operable to store in the memory an extracted batch packaging identification data associated with corresponding retrieved unique item identification data.

In a variant of the above system according to the invention, the level of security may even be increased by allowing the controller to set the test position of a test item to be identified via the first reader within the reading zone. The number of test items may also be set. In another variant of the above invention, a clock may deliver time data to the controller which may associate this time data with the item ID data as they are stored in the memory.

In another variant of the above system according to the invention, in case the controller fails to extract a unique item identification data from a received first reader signal or a batch packaging identification data from a received second reader signal, it is operable to respectively deliver a first or a second identification error data as the unique item identification data or batch packaging identification data respectively corresponding to said received first or second reader signal.

In the above system, in case the controller delivers a first and a second identification error data relating to a delivered packed batch, the controller may be operable to deliver an error message indicating an extraction error relating to a first reader signal and a second reader signal.

Also, in case the controller delivers a first identification error data and extracts a batch packaging identification data from a received second reader signal relating to a delivered packed batch, the controller may be operable to deliver an error message indicating an extraction error relating to a first reader signal. Likewise, in case the controller only delivers a second identification error data relating to a delivered packed batch, the controller may further be operable to deliver an error message indicating an extraction error relating to a second reader signal.

Moreover, in case an error message is delivered by the controller, the controller may further be operable to store said error message in the memory. For example, an error message delivered by the controller may also be sent to a display (possibly associated with time data delivered by the above mentioned clock), in order to alert an operator watching operations on the line. This error message, as well as any part of the data stored in the memory, may further be sent to a remote device via an appropriate transmitter.

Particularly, in case an error message is delivered by the controller, the controller may further be operable to associate in the memory said delivered error message with the corresponding batch packaging identification data of the delivered packed batch.

The present invention will be described more fully hereinafter with reference to the accompanying drawings in which like numerals represent like elements throughout the several figures, and in which prominent aspects and features of the invention are illustrated.

DETAILED DESCRIPTION

Figure 1:
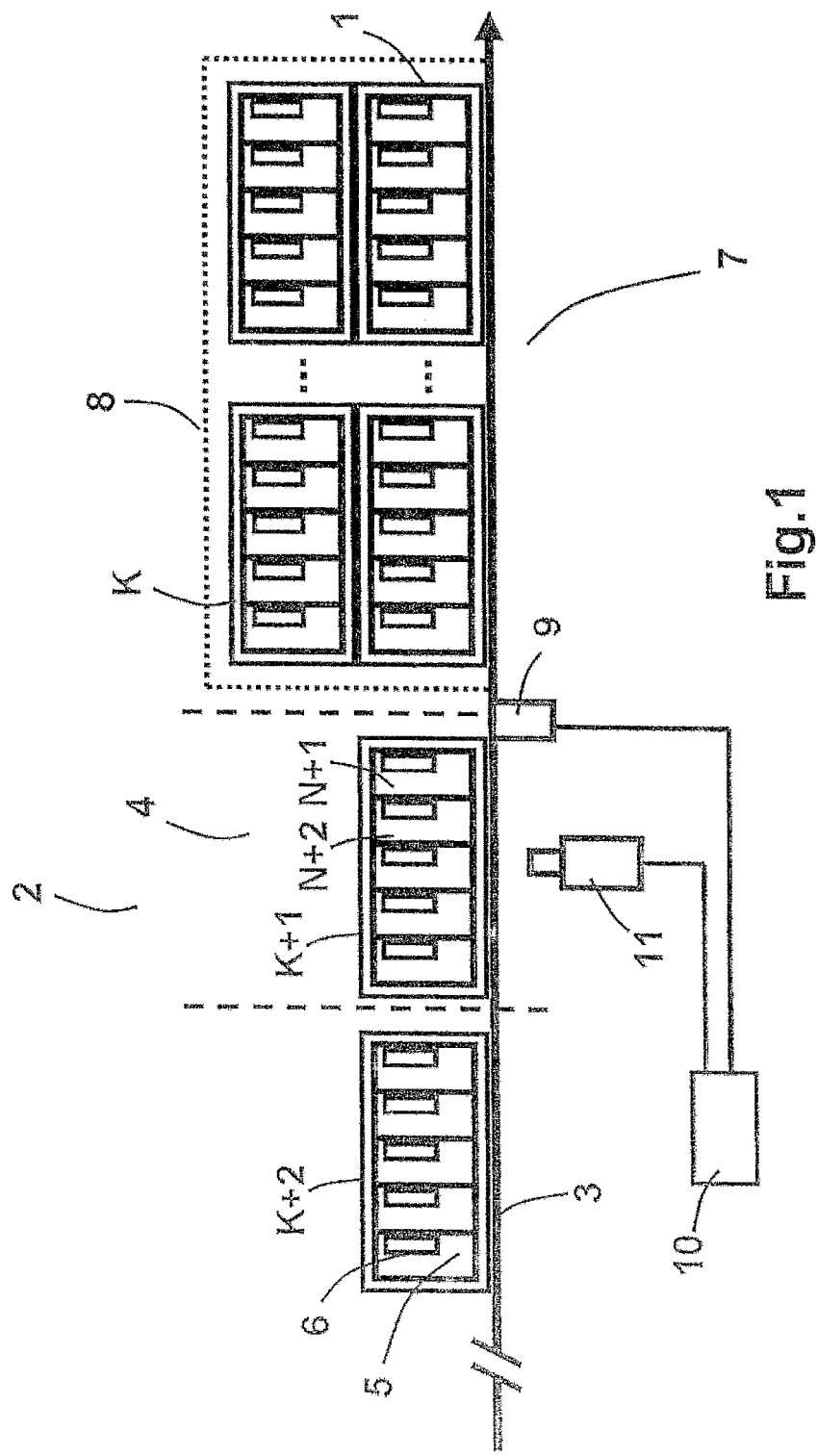
FIG. 1 is a schematic view of control system of a production/distribution line illustrating an embodiment of the invention.
Figure 2:
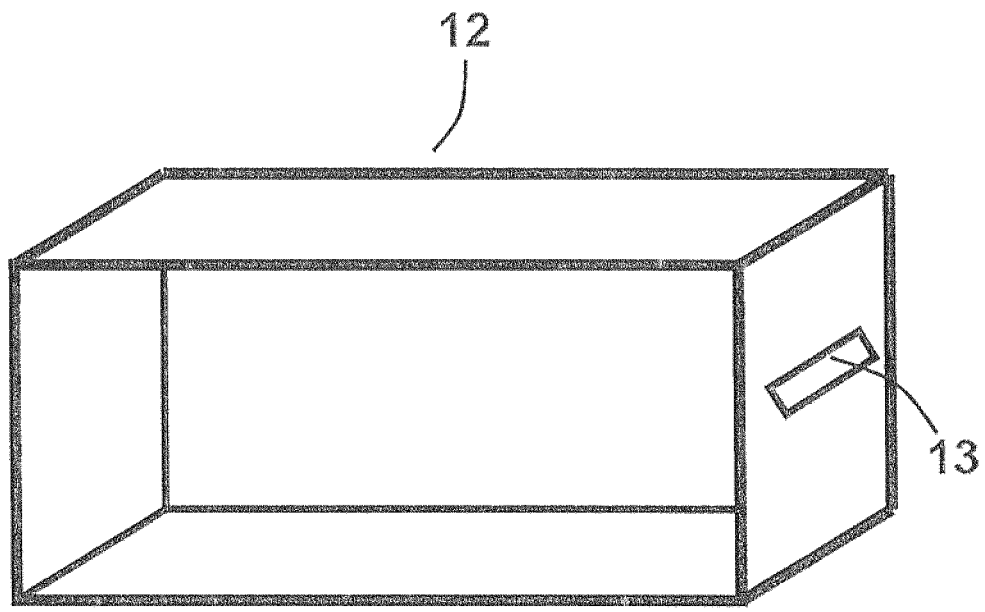
FIG. 2 is a schematic view of a batch packaging for packing items.
Figure 3:
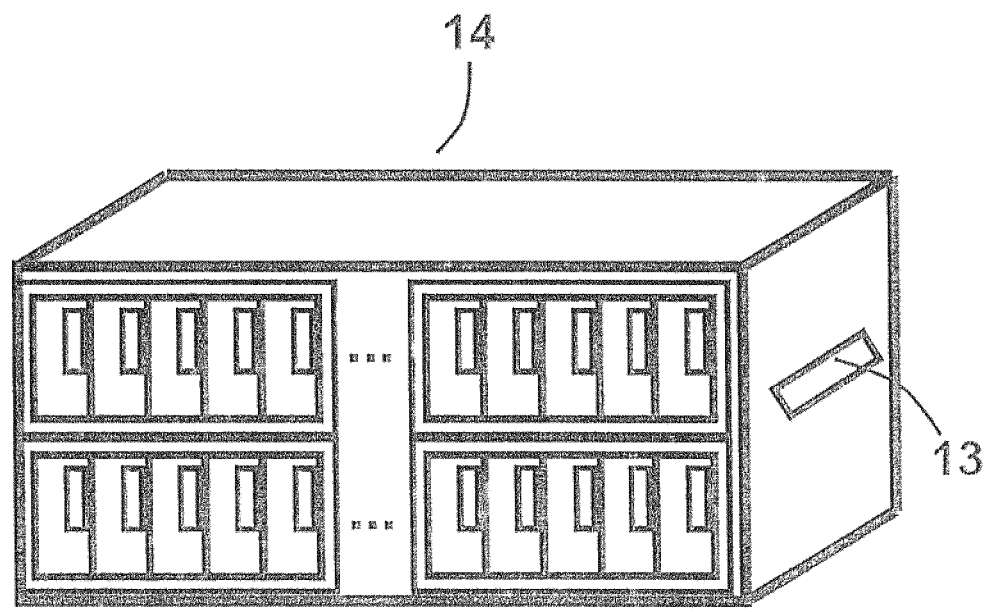
FIG. 3 is a schematic view of a packed batch of items.

In the following non-limiting and illustrative embodiment of the invention, a system for controlling packaging operations on items on a production/distribution line (2), as illustrated in FIG. 1, comprises a conveyor (3) for transporting items (1, 2, . . . N, . . . ), which here are cigarette packs grouped into cartons (1, 2, . . . K, K+1, K+2, . . . ), said cartons being arranged in single file along the transport path toward a reading zone (4) on the line. Each item (5) (cigarette pack) is marked with a unique item identifier (6), here a barcode, which includes unique item identification data of the item. Each carton maintains the cigarette packs in a given disposition: here, a carton corresponds to 5 cigarette packs (this reduced number is just for clarity of the illustrating drawings) wrapped into a transparent plastic film. The reading zone (4) has a length substantially corresponding to that of a carton (along the direction of motion), so that only the cigarette packs within one carton are read. A controller (10) controls the operations on the line. A pusher (7) (i.e. collector device), connected to the controller (10), collects the items transported from the reading zone (4) to form a batch (8) of a given number N of said items, grouped by cartons. A collected full batch (8) contains a number of K cartons (1, 2, . . . , K, on FIG. 1), so that the number of items collected by the pusher when it is full is N=5×K. The pusher (7) delivers said formed batch of items (8) to a packaging device (not represented), also connected to the controller, which packs the received batch of N items (8) into a batch packaging (12) shown on FIG. 2, to obtain a packed batch of items (14) (i.e. a filled case) shown on FIG. 3.

The pusher (7) device includes a sensor (9) connected to the controller (10) for detecting that a batch of N items has been formed. This sensor (9) may be a laser trigger equipped with a counter (which counts the number of times the laser beam has been cut off by a carton), for example. Once the sensor (9) has determined that a batch of N items is formed, by counting that a number of cartons collected by the pusher reaches the desired value of K, it delivers a batch signal to the controller (10). The system further comprises a first camera (11) (i.e. first reader) mounted on the line and connected to the controller (10). The first camera (11) is equipped with an illumination source (not shown) for sequentially illuminating each carton crossing the reading zone (i.e. the view field of the first camera), and operable to read a unique item identifier (6) (barcode printed on each cigarette pack) on each item transported across the reading zone (4) within a carton, through the wrapping film. The first camera (11) takes a digital image of the group of all the illuminated identifiers (6) within the carton. This first camera (11) delivers corresponding first reader signal, corresponding to said digital image of the group of item identifiers, to an image processor in the camera. Said image processor of the first camera then performs image processing of said digital image, detects each barcode pattern present and extracts corresponding unique item identification data, i.e. decodes each one of the five imaged barcodes on the digital image, in accordance with an ordering corresponding to said given disposition, here in single file, of the identifiers in the carton: for example, the item having the first rank in the read carton being the one closer to the sensor (9), and the following items in the opposite direction of transport having respective ranks 2 to 5 within said carton. Then, the first camera (11) sends the extracted unique item identification data to the controller (10) according to said ordering. As known in the art, the first camera may be triggered with a sensor (like a conventional laser trigger, for example) which detect a passage of a carton within the reading zone and thus trigger illumination of the passing carton and activate the first camera to take an image of the carton.

Figure 4:
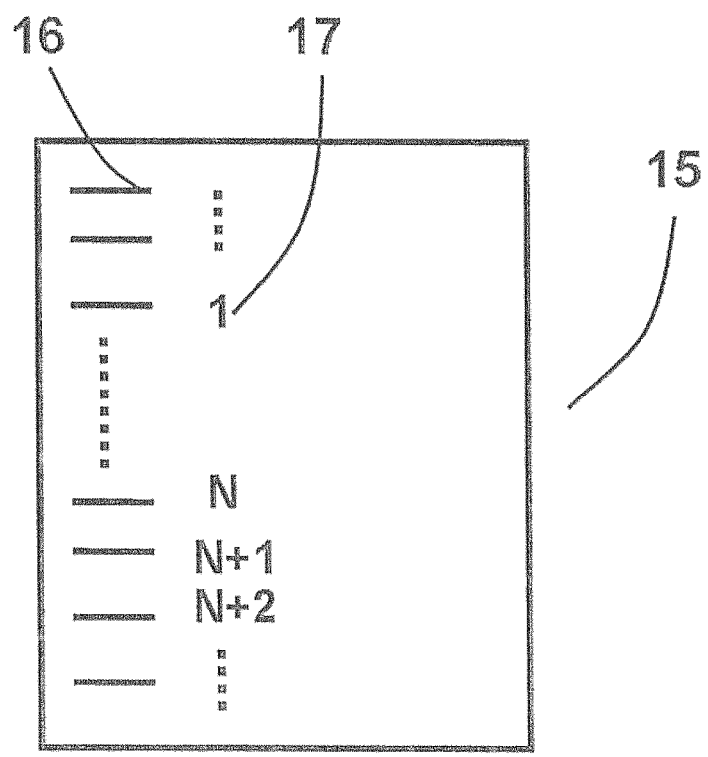
FIG. 4 illustrates a list resulting from sequential storing of unique item identification data according to the embodiment of FIG. 1.

According to the invention, the controller (10), which has a processor (CPU unit) and a memory, is operable to sequentially store in the memory each unique item identification data received from the first camera according to said ordering, so as to form a list (15) of unique item identification data (16) shown in FIG. 4 (each successive line (16) corresponding to each item identification data sequentially stored). For better understanding the invention, there is also indicated on FIG. 4 a rank (17) of corresponding items within a collected batch (8) (i.e. ranks 1, . . . , N) and of following items in the reading zone (i.e. ranks N+1, N+2, . . . ). For example, the full batch (8) contains K cartons (1, . . . , K) and thus N=5×K ordered items, and items N+1 and N+2 in fact correspond to the items having the first and second rank within the carton (K+1) in the reading zone. In this embodiment, the reading zone (4) is disposed just before the entrance of the pusher (7), at the level, but just before sensor (9), as shown on FIG. 1. This placing makes the system particularly robust to errors in case there is a fault or jam in the transport or collection operations.

Upon delivering of the batch signal by sensor (9), the pusher (7) pushes the batch (8) of N items just formed in a packaging device (not shown) which packs said batch (8) into a batch packaging (12), here a case, already marked with a batch barcode (13) (i.e. batch identifier) and delivers a corresponding packed batch (14) (i.e. a case filled with K cartons of cigarette packs). Then a second camera (not shown), i.e. second reader, connected to the controller (10) and triggered by such delivering of the packed batch (14), reads the batch barcode (13) on the packed batch (14) and sends a corresponding second reader signal to the controller (10). The controller (10) then extracts the batch identification data (i.e. decodes barcode (13)) from the received second reader signal. Also, upon reception of the batch signal from the sensor (9), the controller (10) searches in the list (15) which unique item identification data (i.e. which unique item identification data already extracted from a first reader signal previously sent to the controller) correspond to items in the case just delivered (i.e. the items in the K cartons already collected in the pusher as the batch signal is just delivered). For example, the search may start from the last line formed in the list at the instant the batch signal is delivered (i.e. line N on FIG. 4), and item identification data on the preceding lines are then collected up to the line corresponding to a Nth item in the case (i.e. line corresponding to item of rank 1 on FIG. 4, as the list is searched in the reverse order). In a variant of this embodiment, time data from a clock connected to the controller is registered together with extracted unique item identification data and batch signal delivery time on the list, and thus the controller can easily access the line in the list corresponding to the time at which the batch signal is delivered in order to retrieve the item identification data of the N just collected items. Once the relevant unique item identification data has been retrieved (corresponding to the N=5×K cigarette packs in the case), the controller (10) stores in the memory the above extracted batch identification data associated to the retrieved unique item ID data corresponding to the packed batch. From this association of batch content data (item identification data) and package data (packed batch identification data), reliable track and trace operations are made possible.

The invention is not limited to the above embodiments and various modifications may be made without departing from the scope of the invention as defined by the claims. For example, the memory may be distributed (like the processor): at least part of the memory, for example for storing associated batch content data and package data may be in a remote database connected to the controller. As another example, the readers may have their own storage capacities. Thus, although being designated as memory of the controller in the above description of the invention, the memory as defined in the appended claims also includes the case wherein said memory is in fact distributed between several units connected to the controller.

The invention also includes a computer program product operable to make a computer connected to a system for controlling items on a production/distribution line, as described above, implement the steps of the method according to the invention (as described above), when running on said computer.

The method and system for identifying items on a production line according to the invention, in any of its above mentioned aspects, may be used with a high level of confidence for item identification in industry for many applications such as, for example, determining a production volume on said production line (for tax value estimation, etc. . . . ), line production control, line production inspection (for fraud detection, etc. . . . ).

The invention claimed is:

1. Method for controlling items on a production/distribution line, the items being transported according to a given disposition along a transport path of the line through a reading zone toward a collector device operable to collect the items received from the reading zone to form a batch of N items, where N is a given number of said items contained in the formed batch, each transported item being marked with a unique item identifier including unique item identification data of the item, the collector device including a sensor operable to detect that the batch of N items has been formed and to deliver a corresponding batch signal to a controller, said collector device being further operable to deliver the batch of N items to a packaging device connected to the controller, said packaging device being operable to pack the batch of N items delivered by the collector device into a batch packaging marked with a batch packaging identifier including batch packaging identification data to form a packed batch and to deliver said packed batch, the method comprising:

reading, with a first reader, at least one unique identifier on at least one of the items at a corresponding at least one given position within the reading zone, the first reader being connected to the controller and sending a corresponding first reader signal to the controller;

extracting, via the controller, each unique item identification data from the received first reader signal in accordance with an ordering corresponding to said given disposition of the items;

via the controller, sequentially storing in a memory connected to the controller, each unique item identification data extracted from said first reader signal according to said ordering, and forming a list of the extracted unique item identification data;

upon the sensor delivering the corresponding batch signal to the controller, delivering the batch of N items collected by the collector to the packaging device, which packs said delivered batch of N items into the batch packaging and delivers the packed batch, reading, with a second reader connected to the controller, the batch packaging identifier on the batch packaging of the packed batch, the second reader being connected send a corresponding second reader signal to the controller;

extracting, via the controller, a batch packaging identification data from the received second reader signal, and retrieving, via the controller, from the list of extracted unique item identification data, the unique item identification data corresponding to at least one of the N items contained in the packed batch delivered by the packaging device; and via the controller, storing in the memory said extracted batch packaging identification data associated with said retrieved unique item identification data.

2. Method for controlling items on a production/distribution line, the items being transported according to a given disposition along a transport path of the line through a reading zone toward a collector device operable to collect the items received from the reading zone to form a batch of N items, where N is a given number of said items contained in the formed batch, each transported item being marked with a unique item identifier including unique item identification data of the item, the collector device including a sensor operable to detect that the batch of N items has been formed and to deliver a corresponding batch signal to a controller, said collector device being further operable to deliver the batch of N items to a packaging device connected to the controller, said packaging device being operable to pack the batch of N items delivered by the collector device into a batch packaging marked with a batch packaging identifier including batch packaging identification data to form a packed batch and to deliver said packed batch, the method comprising:

reading, with a first reader, at least one unique identifier on at least one of the items at a corresponding at least one given position within the reading zone, the first reader being connected to the controller and sending a corresponding first reader signal to the controller;

extracting, via the controller, each unique item identification data from the received first reader signal in accordance with an ordering corresponding to said given disposition of the items;

via the controller, sequentially storing in a memory connected to the controller, each unique item identification data extracted from said first reader signal according to said ordering, and forming a list of the extracted unique item identification data;

upon the sensor delivering the corresponding batch signal to the controller, delivering the batch of N items collected by the collector to the packaging device, which packs said delivered batch of N items into the batch packaging and delivers the packed batch, reading, with a second reader connected to the controller, the batch packaging identifier on the batch packaging of the packed batch, the second reader being connected send a corresponding second reader signal to the controller;

extracting, via the controller, a batch packaging identification data from the received second reader signal, and retrieving, via the controller, from the list of extracted unique item identification data, the unique item identification data corresponding to at least one of the N items contained in the packed batch delivered by the packaging device; and via the controller, storing in the memory said extracted batch packaging identification data associated with said retrieved unique item identification data, wherein, in case the controller fails to extract a unique item identification data from a received first reader signal or a batch packaging identification data from a received second reader signal, the controller respectively delivers a first or a second identification error data as the unique item identification data or batch packaging identification data respectively corresponding to said received first or second reader signal.

3. Method according to claim 2, wherein, in case the controller delivers a first and a second identification error data relating to a delivered packed batch, the controller delivers an error message indicating an extraction error relating to the first reader signal and the second reader signal.

4. Method according to claim 2, wherein, in case the controller delivers a first identification error data and extracts a batch packaging identification data from a received second reader signal relating to a delivered packed batch, the controller delivers an error message indicating an extraction error relating to the first reader signal.

5. Method according to claim 2, wherein, in case the controller only delivers a second identification error data relating to a delivered packed batch, the controller delivers an error message indicating an extraction error relating to the second reader signal.

6. Method according to claim 3, further comprising, in case an error message is delivered by the controller, storing said error message in the memory by the controller.

7. Method according to claim 6, further comprising, in case an error message is delivered by the controller, associating in the memory said error message with the corresponding batch packaging identification data of the delivered packed batch, by the controller.

8. System for controlling items on a production/distribution line, comprising:

a transport operable to transport items according a given disposition along a transport path of the line through a reading zone toward a collector device operable to collect the items received from the reading zone to form a batch of N items, where N is a given number of said items contained in the formed batch, each transported item being marked with a unique item identifier including unique item identification data of the item;

the collector device including a sensor operable to detect that the batch of N items has been formed and to deliver a corresponding batch signal to a controller, said collector device being further operable to deliver the batch of N items to a packaging device connected to the controller;

said packaging device being operable to pack the batch of N items delivered by the collector device into a batch packaging marked with a batch packaging identifier including batch packaging identification data to form a packed batch and deliver said packed batch;

a first reader connected to the controller operable to read at least one unique identifier on at least one of the items at corresponding at least one given position within the reading zone, and to send a corresponding first reader signal to the controller;

a memory connected to the controller;

the controller is operable to extract each unique item identification data from a received first reader signal, in accordance with an ordering corresponding to said given disposition of the items;

the controller is operable to sequentially store in the memory each unique item identification data extracted from said first reader signal according to said ordering, and to form a list of the extracted unique item identification data;

upon the sensor delivering the corresponding batch signal, the collector is operable to deliver the batch of N collected items to the packaging device, which is operable to pack the delivered batch of N items into the packaging batch and to deliver a packed batch, a second reader connected to the controller operable to read the batch packaging identifier on the batch packaging of the packed batch and to send a corresponding second reader signal to the controller;

the controller is operable to extract a batch packaging identification data from the received second reader signal, and to retrieve from the list of extracted unique item identification data, the unique item identification data corresponding to at least one of the N items contained in the packed batch delivered by the packaging device; and the controller is further operable to store in the memory the extracted batch packaging identification data associated with corresponding retrieved unique item identification data.

9. System for controlling items on a production/distribution line, comprising:

a transport operable to transport items according a given disposition along a transport path of the line through a reading zone toward a collector device operable to collect the items received from the reading zone to form a batch of N items, where N is a given number of said items contained in the formed batch, each transported item being marked with a unique item identifier including unique item identification data of the item;

the collector device including a sensor operable to detect that the batch of N items has been formed and to deliver a corresponding batch signal to a controller, said collector device being further operable to deliver the batch of N items to a packaging device connected to the controller;

said packaging device being operable to pack the batch of N items delivered by the collector device into a batch packaging marked with a batch packaging identifier including batch packaging identification data to form a packed batch and deliver said packed batch;

a first reader connected to the controller operable to read at least one unique identifier on at least one of the items at corresponding at least one given position within the reading zone, and to send a corresponding first reader signal to the controller;

a memory connected to the controller;

the controller is operable to extract each unique item identification data from a received first reader signal, in accordance with an ordering corresponding to said given disposition of the items;

the controller is operable to sequentially store in the memory each unique item identification data extracted from said first reader signal according to said ordering, and to form a list of the extracted unique item identification data;

upon the sensor delivering the corresponding batch signal, the collector is operable to deliver the batch of N collected items to the packaging device, which is operable to pack the delivered batch of N items into the packaging batch and to deliver a packed batch, a second reader connected to the controller operable to read the batch packaging identifier on the batch packaging of the packed batch and to send a corresponding second reader signal to the controller;

the controller is operable to extract a batch packaging identification data from the received second reader signal, and to retrieve from the list of extracted unique item identification data, the unique item identification data corresponding to at least one of the N items contained in the packed batch delivered by the packaging device; and the controller is further operable to store in the memory the extracted batch packaging identification data associated with corresponding retrieved unique item identification data, wherein, in case the controller fails to extract a unique item identification data from a received first reader signal or a batch packaging identification data from a received second reader signal, the controller is operable to respectively deliver a first or a second identification error data as the unique item identification data or batch packaging identification data respectively corresponding to said received first or second reader signal.

10. System according to claim 9, wherein, in case the controller delivers a first and a second identification error data relating to a delivered packed batch, the controller is operable to deliver an error message indicating an extraction error relating to the first reader signal and the second reader signal.

11. System according to claim 10, wherein, in case an error message is delivered by the controller, the controller is further operable to store said error message in the memory.

12. System according to claim 11, wherein, in case an error message is delivered by the controller, the controller is further operable to associate in the memory said delivered error message with the corresponding batch packaging identification data of the delivered packed batch.

13. System according to claim 9, wherein, in case the controller delivers a first identification error data and extracts a batch packaging identification data from a received second reader signal relating to a delivered packed batch, the controller is operable to deliver an error message indicating an extraction error relating to the first reader signal.

14. System according to claim 9, wherein, in case the controller only delivers a second identification error data relating to a delivered packed batch, the controller is operable to deliver an error message indicating an extraction error relating to the second reader signal.

* * * * *